United States Patent
Gibb

(10) Patent No.: US 8,500,174 B2
(45) Date of Patent: Aug. 6, 2013

(54) PIPE COUPLING HAVING COMPRESSION BAND

(75) Inventor: John Gibb, Beeton (CA)

(73) Assignee: Victaulic Company, Easton, PA (US)

( * ) Notice: Subject to any disclaimer, the term of this patent is extended or adjusted under 35 U.S.C. 154(b) by 991 days.

(21) Appl. No.: 11/127,858

(22) Filed: May 12, 2005

(65) Prior Publication Data

US 2005/0258641 A1  Nov. 24, 2005

Related U.S. Application Data

(60) Provisional application No. 60/571,596, filed on May 14, 2004.

(51) Int. Cl.
F16L 23/00 (2006.01)
(52) U.S. Cl.
USPC .......................... 285/367; 285/112; 285/365
(58) Field of Classification Search
USPC ................. 285/122, 95, 367, 410, 364, 365, 285/366, 407, 411, 420, 112
See application file for complete search history.

(56) References Cited

U.S. PATENT DOCUMENTS

| | | | |
|---|---|---|---|
| 29,731 A | 8/1860 | Truss | |
| 1,093,868 A | 4/1914 | Leighty | |
| 2,028,182 A * | 1/1936 | Barnickol, Jr. | 285/112 |
| 2,403,606 A * | 7/1946 | Meyer | 24/276 |
| 2,769,648 A | 11/1956 | Herman | |
| 2,883,211 A * | 4/1959 | Grass | 285/233 |
| 3,054,629 A * | 9/1962 | Piatek | 285/373 |
| 3,129,920 A * | 4/1964 | Stillwagon | 251/148 |
| 3,235,293 A * | 2/1966 | Condon | 285/233 |
| 3,351,352 A * | 11/1967 | Blakeley et al. | 277/615 |
| 3,664,691 A * | 5/1972 | Nakamura | 277/615 |
| 3,797,078 A | 3/1974 | LaPointe | |
| 3,861,723 A * | 1/1975 | Kunz et al. | 285/410 |
| 3,877,733 A | 4/1975 | Straub | |
| 3,905,623 A | 9/1975 | Cassel | |
| 4,403,378 A | 9/1983 | Engman | |
| 4,471,979 A | 9/1984 | Gibb et al. | |
| 4,506,418 A | 3/1985 | Viola et al. | |
| 4,522,434 A | 6/1985 | Webb | |
| 4,601,495 A | 7/1986 | Webb | |
| 4,611,839 A * | 9/1986 | Rung et al. | 285/367 |
| 4,722,561 A | 2/1988 | Heckethorn et al. | |
| 4,779,901 A | 10/1988 | Halling | |
| 4,842,306 A * | 6/1989 | Zeidler et al. | 285/104 |
| 4,861,075 A | 8/1989 | Pepi et al. | |
| 4,898,407 A * | 2/1990 | Zeidler | 285/328 |

(Continued)

FOREIGN PATENT DOCUMENTS

GB  2 253 451  9/1992

Primary Examiner — James Hewitt
Assistant Examiner — Jay R Ripley
(74) Attorney, Agent, or Firm — Bellard Spahr LLP

(57) ABSTRACT

A coupling for joining pipe elements in end to end relationship is disclosed. The coupling includes a sealing member having an inner diameter and an outer surface. A plurality of segments are supported on the sealing member's outer surface. Each segment has a pair of arcuate surfaces positioned in space relation on either side of the sealing member. A compression band surrounds the outer perimeter of the segments, the segments being captured between the band and the sealing member. The pipe elements are inserted into the inner diameter between the segments. A tensioning member is mounted on the band. Tightening of the tensioning member causes the compression band to force the segments radially inwardly into engagement with outer surfaces of the pipe elements.

36 Claims, 8 Drawing Sheets

U.S. PATENT DOCUMENTS

| | | |
|---|---|---|
| 5,018,548 A | 5/1991 | McLennan |
| 5,058,931 A | 10/1991 | Bowsher |
| 5,203,594 A | 4/1993 | Straub |
| 5,230,537 A | 7/1993 | Newman |
| 5,240,294 A * | 8/1993 | Corcoran ............... 285/373 |
| 5,246,257 A * | 9/1993 | Kojima et al. ............ 285/112 |
| 5,280,969 A | 1/1994 | Straub |
| 5,280,970 A | 1/1994 | Straub |
| 5,411,162 A * | 5/1995 | Koziczkowski et al. ...... 220/320 |
| 6,070,914 A * | 6/2000 | Schmidt ............... 285/112 |
| 6,170,884 B1 * | 1/2001 | McLennan et al. ......... 285/112 |
| 6,206,434 B1 | 3/2001 | Schreiter |
| 6,231,052 B1 * | 5/2001 | Forlander ............... 277/616 |
| 6,302,450 B1 * | 10/2001 | Dole et al. ............... 285/328 |
| 2002/0171244 A1 | 11/2002 | Wachter et al. |
| 2003/0062718 A1 * | 4/2003 | Radzik .................. 285/94 |

* cited by examiner

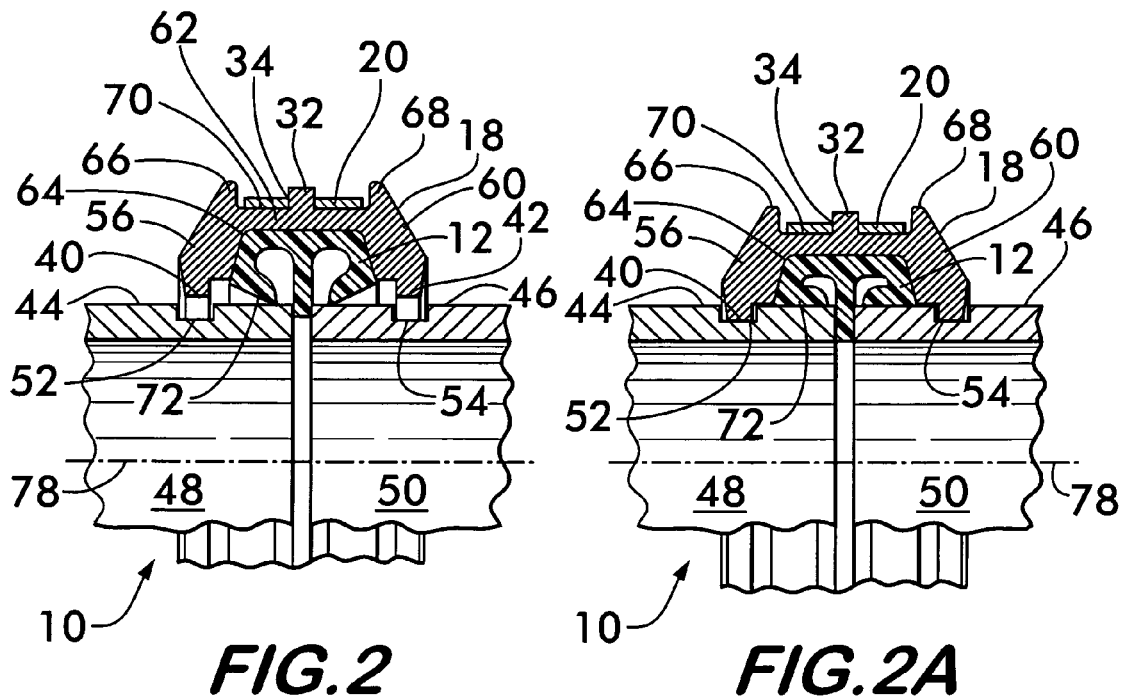
*FIG.2*  *FIG.2A*
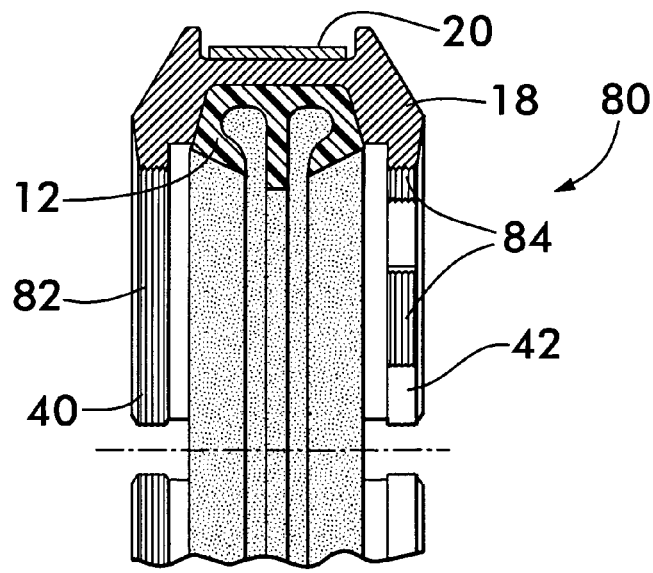
*FIG.2B*

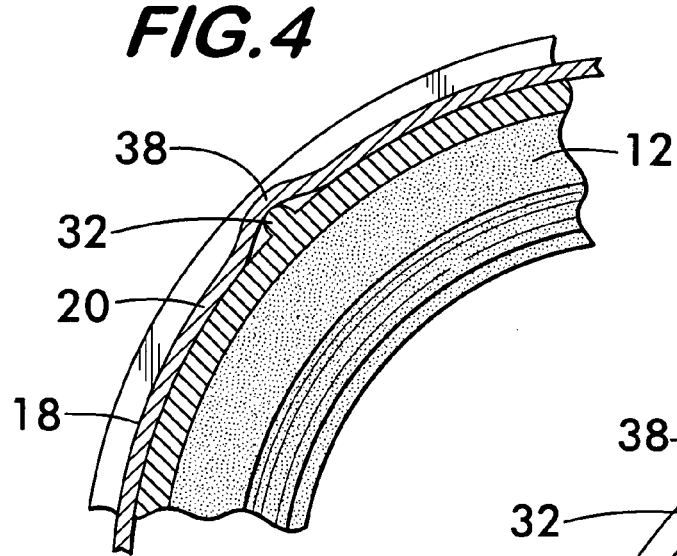
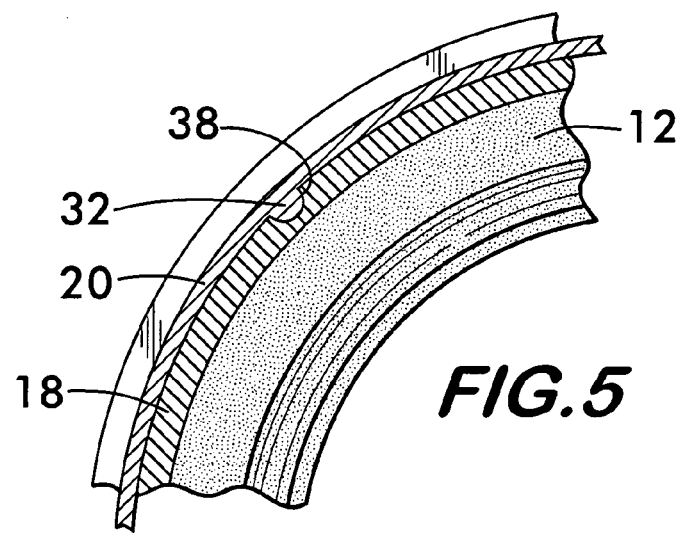
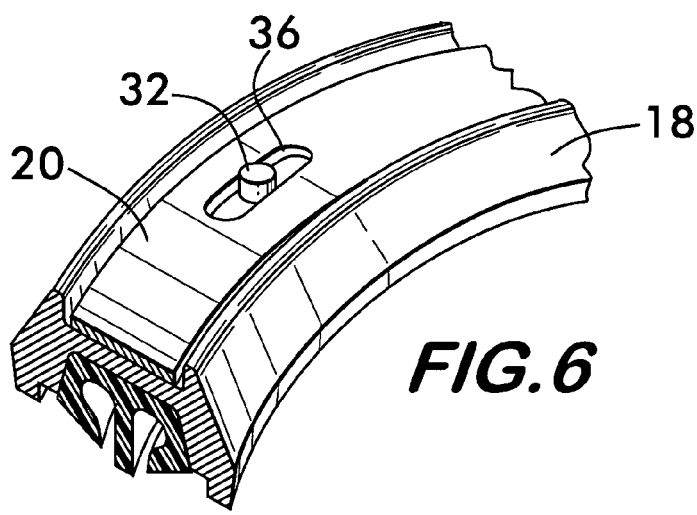

PIPE COUPLING HAVING COMPRESSION BAND

CROSS REFERENCE TO RELATED APPLICATION

This application is based on and claims priority to U.S. Provisional Application No. 60/571,596, filed May 14, 2004.

FIELD OF THE INVENTION

This invention concerns couplings for joining pipe elements end to end, the couplings having multiple segments held together by a compression band.

BACKGROUND OF THE INVENTION

Mechanical couplings for joining pipe elements together end-to-end comprise interconnectable segments that are positionable circumferentially surrounding the end portions of co-axially aligned pipe elements. The term "pipe element" is used herein to describe any pipe-like item or component having a pipe like form. Pipe elements include pipe stock, pipe fittings such as elbows, caps and tees as well as fluid control components such as valves, reducers, strainers, restrictors, pressure regulators and the like.

Each mechanical coupling segment comprises a housing having arcuate surfaces which project radially inwardly from the housing and engage plain end pipe elements or circumferential grooves that extend around each of the pipe elements to be joined. Engagement between the arcuate surfaces and the pipe elements provides mechanical restraint to the joint and ensures that the pipe elements remain coupled even under high internal pressure and external forces. The housings define an annular channel that receives a gasket or seal, typically an elastomeric ring which engages the ends of each pipe element and cooperates with the segments to provide a fluid tight seal. The segments have connection members, typically in the form of lugs which project outwardly from the housings. The lugs are adapted to receive fasteners, such as nuts and bolts, which are adjustably tightenable to draw the segments toward one another.

To ensure a good fit between the couplings and the pipe elements, the arcuate surfaces on prior art couplings have a radius of curvature that is substantially matched to the radius of curvature of the outer surface of the pipe element that it is intended to engage. For couplings used with grooved pipe elements, the radii of curvature of the arcuate surfaces are smaller than the radii of curvature of the outer surfaces of the pipe elements outside of the grooves so that the arcuate surfaces fit within and engage the grooves properly.

This geometrical relation between the arcuate surfaces of the couplings and the outer surfaces of the pipe elements in prior art couplings results in a tedious and time consuming installation process when mechanical couplings are used. Typically, the coupling is received by the technician with the segments bolted together and the ring seal captured within the segments' channels. The technician first disassembles the coupling by unbolting it, removes the ring seal, lubricates it (if not pre-lubricated) and places it around the ends of the pipe elements to be joined. Installation of the ring seal requires that it be lubricated and stretched to accommodate the pipe elements, an often difficult and messy task, as the ring seal is usually stiff and the lubrication makes manual manipulation of the seal difficult. With the ring seal in place on both pipe elements, the segments are then placed one at a time straddling the ends of the pipe elements and capturing the ring seal against them. During placement, the segments engage the seal, the arcuate surfaces are aligned with the grooves when present, or with alignment marks made on the outside surfaces of the pipe elements, the bolts are inserted through the lugs, the nuts are threaded onto the bolts and tightened, drawing the coupling segments toward one another, compressing the seal and engaging the arcuate surface within the grooves.

As evident from the previous description, installation of mechanical pipe couplings according to the prior art requires that the technician typically handle at least seven individual piece parts (and more when the coupling has more than two segments), and must totally disassemble and reassemble the coupling. Significant time, effort and expense would be saved if the technician could install a mechanical pipe coupling without first totally disassembling it and then reassembling it, piece by piece.

SUMMARY OF THE INVENTION

The invention concerns a pipe coupling positionable straddling facing end portions of a pair of pipe elements for securing the pipe elements together in end to end relationship. The pipe coupling comprises a deformable sealing member having an inner diameter sized to receive the pipe elements and an outer surface. A plurality of segments are supported on the outer surface of the sealing member. The segments are positioned circumferentially around the sealing member in predetermined spaced apart relation to one another. Each segment has a pair of arcuate surfaces positioned on opposite sides of the sealing member. The arcuate surfaces are engageable with the pipe elements to retain them in end to end relationship. A compression band extends around an outer perimeter of the segments. The segments are captured between the band and the sealing member. A tensioning member is mounted on the band. The tensioning member is adjustably tightenable for forcing the segments substantially radially inwardly against the sealing member. Tightening of the tensioning member moves the arcuate surfaces into engagement with the pipe elements.

Preferably, the segments are spaced apart from one another at substantially equal intervals. In order to maintain the spacing of the segments, one or more projections are mounted on either the band or the segments. The projections limit relative motion between the band and the segments and serve to hold the segments at a predetermined position relatively to the band. Preferably, the projections are attached to the segments and extend substantially radially outwardly. The band has apertures therethrough or indentations at spaced intervals for receiving the projections.

The segments have oppositely disposed end faces that engage each other as the tensioning member is tightened to force the segments inwardly against the sealing member. In one embodiment, the end faces are oriented substantially parallel to a longitudinal axis of the pipe elements. The end faces may be brought into engagement with one another upon tightening of the tensioning member.

In another embodiment, the segments have oppositely disposed end faces oriented angularly relatively to a longitudinal axis of the pipe elements. Each end face on each segment is substantially parallel to an adjacent end face on an adjacent segment. The end faces on each segment have opposite slopes from one another. The end faces are brought into engagement with one another upon tightening of the tensioning member, and the angular orientation of the end faces causes neighboring segments to move in opposite directions lengthwise along the pipe elements.

In yet another embodiment, the segments have oppositely disposed end faces oriented angularly relatively to a longitudinal axis of the pipe elements. Each end face on each segment is substantially parallel to an adjacent end face on an adjacent segment. The end faces on each segment have substantially the same slope. The end faces are brought into engagement with one another upon tightening of the tensioning member, and the angular orientation of the end faces causes neighboring segments to rotate in opposite directions relative to one another about respective axes along radii of the segments that are substantially perpendicular to the axis of the pipe elements.

BRIEF DESCRIPTION OF THE DRAWINGS

FIGS. 2, 2A and 2B are longitudinal sectional views of the coupling shown in FIG. 1;

FIG. 4 is a partial axial cross-sectional view showing a detail of a coupling according to the invention;

FIG. 5 is a partial axial cross-sectional view showing a detail of a coupling according to the invention;

FIG. 6 is a perspective view showing a detail of a coupling according to the invention;

DETAILED DESCRIPTION OF THE EMBODIMENTS

Figure 1:
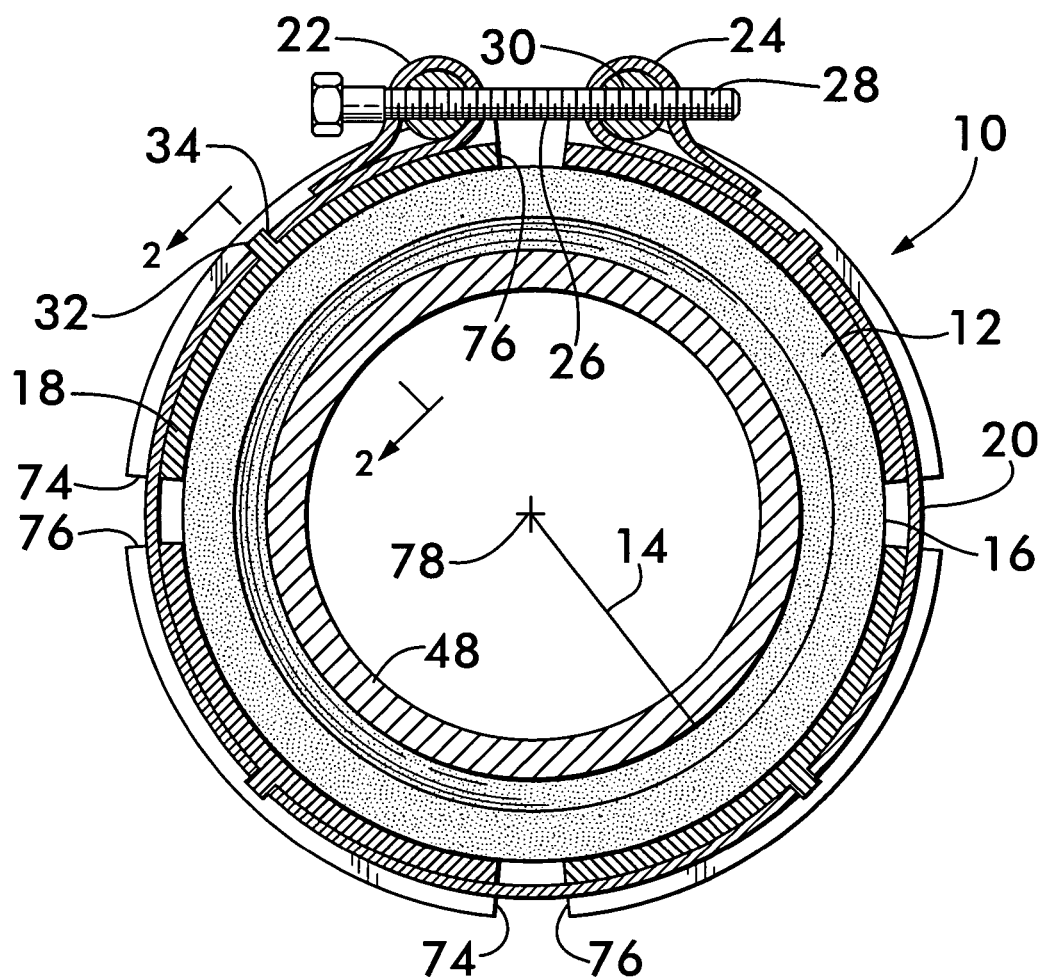
FIG. 1 is an axial cross-sectional view of a coupling according to the invention.

FIG. 1 shows a compression band pipe coupling 10 for securing pipe elements together in end to end relationship according to the invention. Coupling 10 comprises a deformable sealing member 12, preferably in the form of a ring of elastomeric material. Sealing member 12 engages the pipe elements to ensure a fluid-tight joint as described below. Sealing member 12 has an inner diameter 14 sized to receive the pipe elements and an outer surface 16. Outer surface 16 supports a plurality of segments 18. Segments 18 are preferably formed of metal and may be cast, formed, stamped or machined. The segments are supported on the outer surface 16 of the sealing member 12 and are positioned circumferentially around it in predetermined spaced apart relation to one another. A compression band 20 extends around the outer perimeter of the segments 18. Band 20 is preferably a flexible metal strap and has opposite ends 22 and 24 connected to one another by a tensioning member 26 mounted thereon. Tensioning member 26 preferably comprises a threaded bolt 28 mounted on one band end 22 and a threaded body 30 mounted on the other band end 24. The bolt 28 is rotatable and engages the threaded body 30. Tightening of the bolt draws the band ends 22 and 24 towards one another, applies tension to the band and forces the segments 18 radially inwardly against the sealing member 12.

Figure 1A:
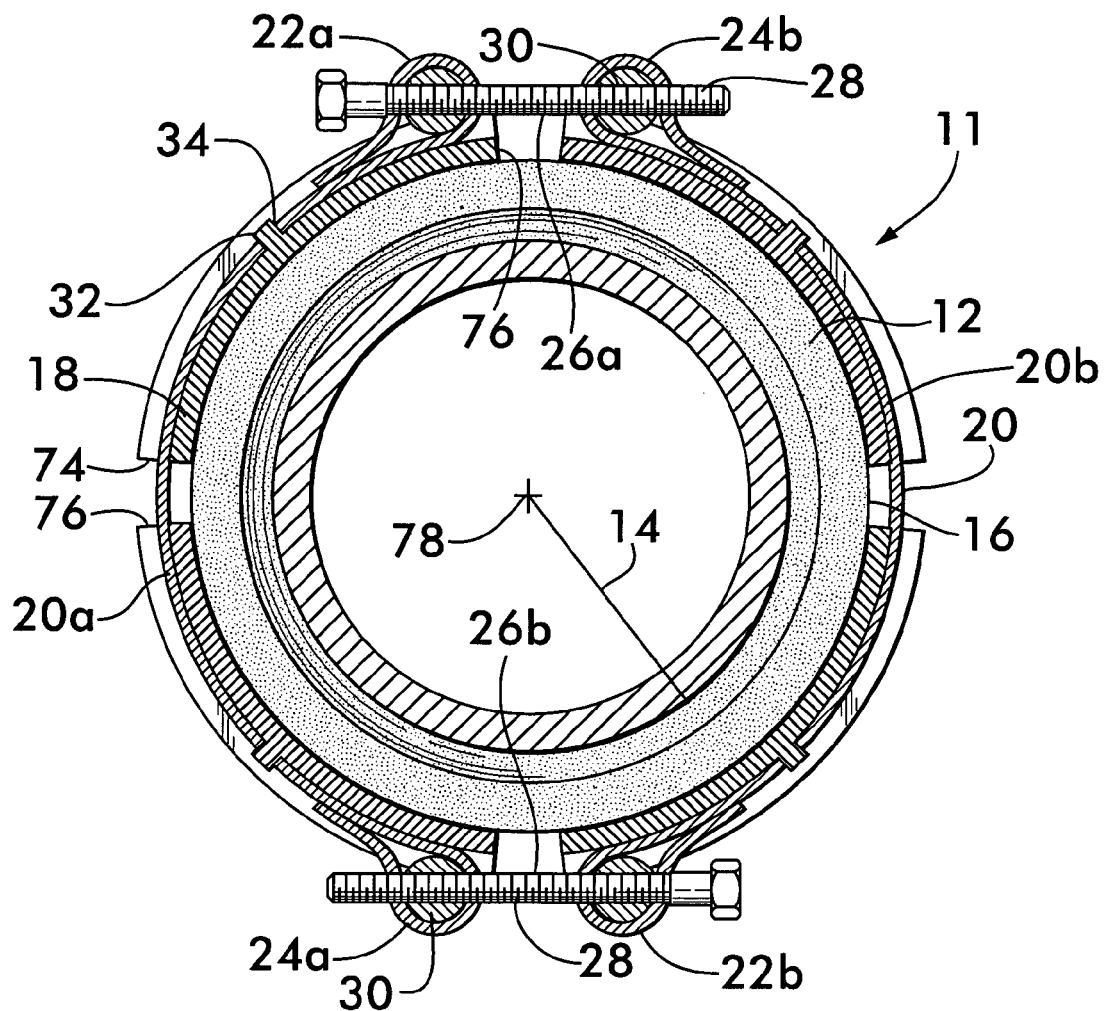
FIG. 1A is an axial cross-sectional view of an alternate embodiment of a coupling according to the invention.

FIG. 1A illustrates an alternate coupling embodiment 11 wherein compression band 20 is divided into a plurality of band portions, in this example, two portions, 20a and 20b. Each band portion has opposite ends 22a and 24a, and 22b and 24b respectively, which are positioned adjacent to one another so as to arrange the band portions in end to end relationship around the segments 18. The ends in facing relation, 22a and 24b, and 22b and 24a, are joined by respective tensioning members 26a (mounted between 22a and 24b) and 26b (mounted between 22b and 24a). Each tensioning member preferably also comprises a bolt 28, mounted on one end of a band portion (22a and 22b), the bolt engaging a threaded body 30 mounted on the adjacent end portion (24a, 24b). Tightening of the tensioning members applies tension to the band portions and forces the segments 18 radially inwardly against the sealing member 12. Compression band couplings having two or more band portions and the appropriate number of tensioning members are advantageous for use with larger diameter pipes to distribute the tension force among multiple tension members and limit the size of the bolts required to reasonable and practical lengths and diameters.

With reference again to FIG. 1, it is advantageous to maintain the segments 18 in spaced apart relation at substantially equal intervals around the seal. This ensures that no large gaps form between the segments that will allow the sealing member to be pinched during assembly or blow out under pressure. To this end, each segment 18 has a projection 32 that extends radially outwardly and engages an aperture 34 in band 20. The positions of the apertures in the band and the projections on the segments are coordinated such that the apertures receive the projections and maintain the segments in the desired relative spacing, engagement between the projections and the band limiting the relative motion between the band and the segments. In order to allow some free play permitting the segments 18 to shift circumferentially relatively to sealing member 12, the apertures 34 may be oversized holes or, as shown in FIG. 6, they may comprise slots 36 that extend lengthwise along the band 20. Alternately, projections 32 may be relatively flexible or deformable to allow relative shifting of the segments when the tensioning member is tightened. Deformation may be elastic, plastic, or a combination of the two.

As shown in FIG. 4, in an alternate embodiment of the coupling, segments 18 may have a projection 32 that is received within an indentation 38 in band 20. Indentation 38 may be elongated to allow some free play to the segments. Alternately, as shown in FIG. 5, the projection 32 may be mounted on the band 20 and the indentation 38 which receives it is positioned in the segment 18.

As shown in FIG. 2, segments 18 each have a pair of arcuate surfaces 40 and 42 positioned respectively on opposite sides of the sealing member 12. Arcuate surfaces 40 and 42 respectively engage outer surfaces 44 and 46 of pipe elements 48 and 50 when the tensioning member is tightened. Preferably, arcuate surfaces 40 and 42 project substantially radially inwardly and engage respective grooves 52 and 54 formed in the outer surfaces 44 and 46. Engagement between the arcuate surfaces and the grooves provides mechanical restraint to the joint and ensures that the pipe elements remain coupled even under high internal pressure and/or external force. Couplings 10 according to the invention may also be used with plain end pipe elements (described below) as well as with pipe elements that have shoulders proximate the ends or which have flared or expanded ends.

Arcuate surfaces 40 and 42 are positioned at the ends of segment sidewalls 56 and 60 that are joined by a back wall 62 and together form a channel 64 that receives the sealing member 12. Additional sidewalls 66 and 68 may also be extended radially outwardly to form a trough 70 that receives the band 20. Trough 70 helps keep the band properly engaged with the segments 18 during tightening of the tensioning member 26 by limiting the axial and rotational motion of the segments relatively to the band.

Installation of the banded coupling is described with respect to FIGS. 1, 2 and 2A. As shown in FIGS. 1 and 2, coupling 10 is sized with segments 18 spaced diametrically from one another such that pipe elements 48 and 50 may be inserted between the segments in end to end relationship. The pipe elements are received by the sealing element 12, which may have lips 72 that engage the pipe element outer surfaces 44 and 46 and use the internal pressure within the pipe elements to effect a tighter seal. Once both pipe elements are engaged within the coupling 10, the grooves 52 and 54, if present, are aligned with the arcuate surfaces 40 and 42 and the tensioning member 26 is tightened. As shown in FIG. 2A, this forces the arcuate surfaces on each segment into engagement with the outer surfaces 44 and 46 of the pipe elements, in this example within grooves 52 and 54.

As shown in FIG. 1, segments 18 have oppositely disposed end faces 74 and 76. End faces 74 and 76 are oriented substantially parallel to the longitudinal axis 78 of the pipe elements to be joined. As the tensioning member 26 is tightened, the end faces on adjacent segments move toward one another and the segments may be sized so that the end faces are in contact with one another to close off the entire outer surface 16 of the sealing member 12 when the arcuate surfaces 40 and 42 are engaged with grooves 52 and 54.

While projecting arcuate surfaces engageable with grooved pipes are a preferred embodiment, the coupling according to the invention may also be used to join plain end pipe elements. Such an embodiment 80 is shown in FIG. 2B, wherein segments 18 have arcuate surfaces 40 and 42 that may comprise a tooth or teeth 82 and 84. The teeth, when present, face substantially radially inwardly to grip the outer surface of plain pipe elements and provide mechanical restraint to the joint when the tensioning member of the coupling is tightened and the segments are forced into engagement with the pipe elements. The teeth may extend substantially continuously around the segment as illustrated by teeth 82, or they may be a single tooth 84, or a plurality of single teeth 84 spaced apart at intervals from one another.

Figure 3:
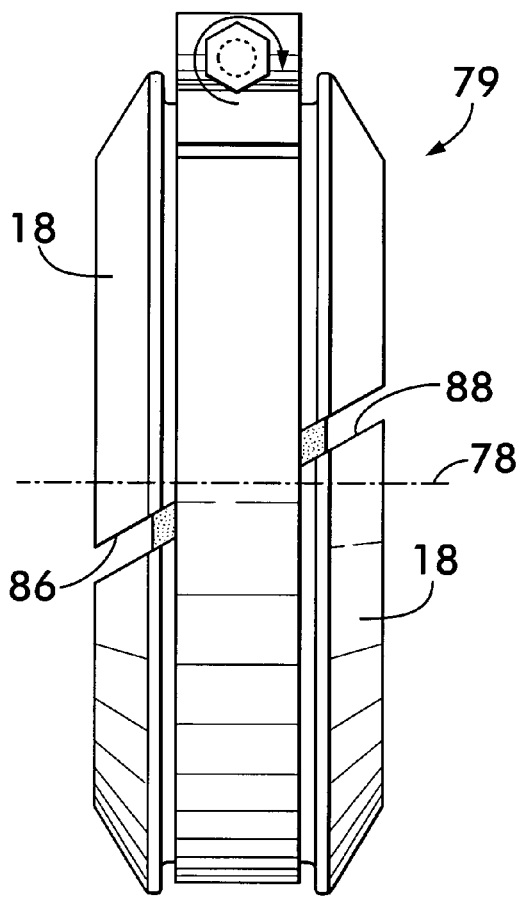
FIGS. 3 and 3A are side views of a coupling embodiment according to the invention.
Figure 3A:
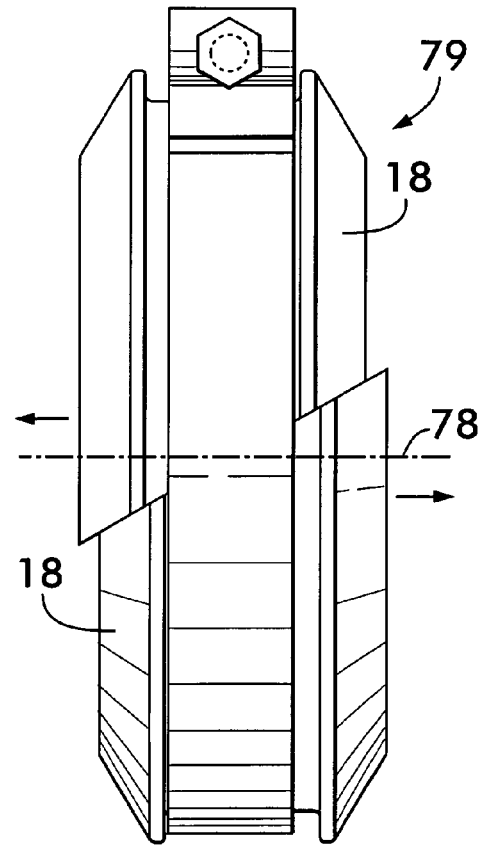
Figure 7:
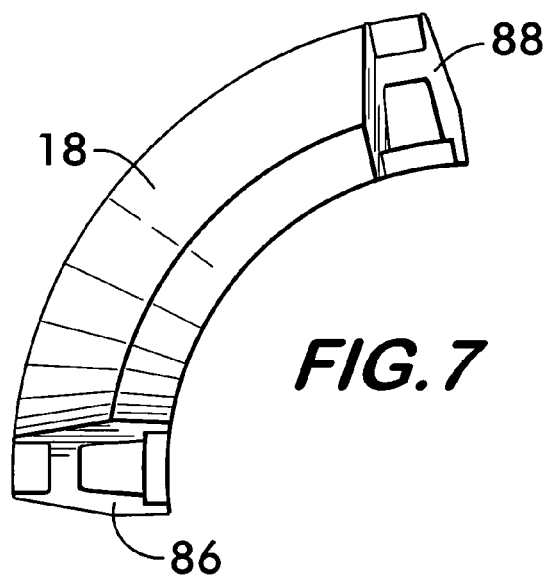
FIG. 7 is an axial view of a segment used with the coupling shown in FIG. 3.
Figure 7A:
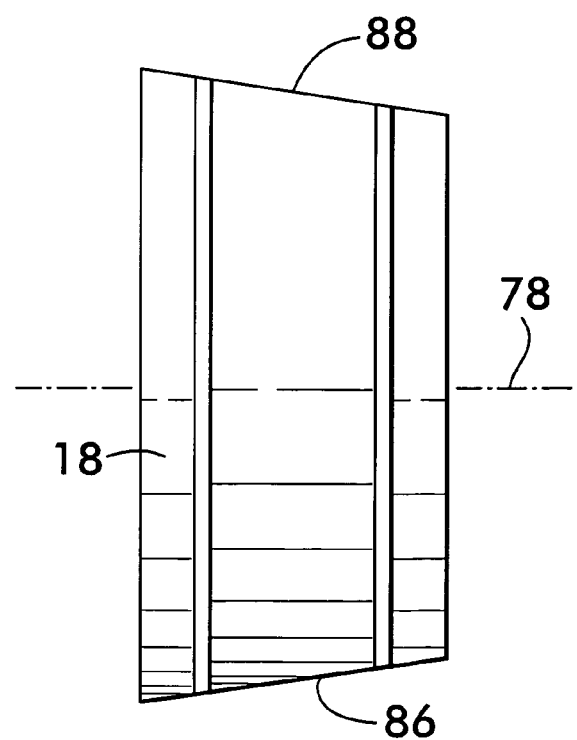
FIG. 7A is a side view of the segment shown in FIG. 7.

In an alternate coupling embodiment 79, shown in FIGS. 3 and 3A, segments 18 have opposite end faces 86 and 88 that are angularly oriented with respect to the longitudinal axis 78 of the pipe elements. This angular orientation is best shown in FIGS. 7 and 7A. FIG. 7 shows an axial view of a single segment 18 from coupling 79 wherein end faces 86 and 88 are visible. FIG. 7A shows the segment 18 of FIG. 7 as it would appear looking inwardly toward axis 78 to render the relative orientation of both end faces 86 and 88 visible and thus emphasize the angular relation between the end faces and the axis 78. Note that the end faces on each segment have opposite slopes. Furthermore, as shown in FIGS. 3 and 3A, the end faces 86 and 88 on neighboring segments 18 are substantially parallel to one another. In this embodiment, the segments are sized so that the end faces 86 on each segment engage the end faces 88 on each neighboring segment upon tightening of the tensioning member and as the arcuate surfaces begin to engage the outer surface of the pipe elements being joined together. The angular orientation of the end faces is such that forced contact between them (engendered by tightening of the tensioning member) causes neighboring segments to move in opposite directions to one another in the direction lengthwise along the pipe elements as shown in FIG. 3A. Relative shifting of the segments 18 is advantageous when the coupling is used with grooved pipe because the lengthwise motion of the segments forces the arcuate surfaces into engagement with the shoulders of the grooves and increases the stiffness of the joint about all of its axes.

Figure 8:
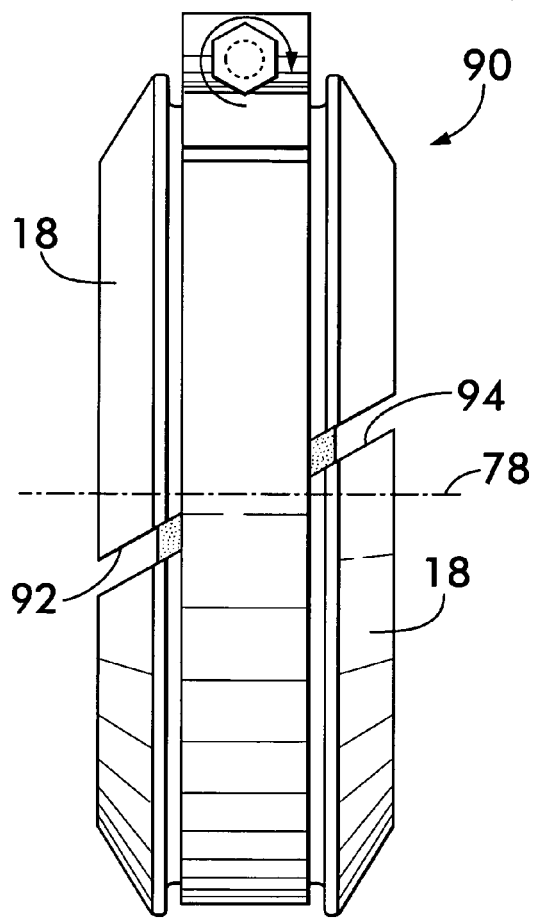
FIGS. 8 and 8A are side views of a coupling embodiment according to the invention.
Figure 8A:
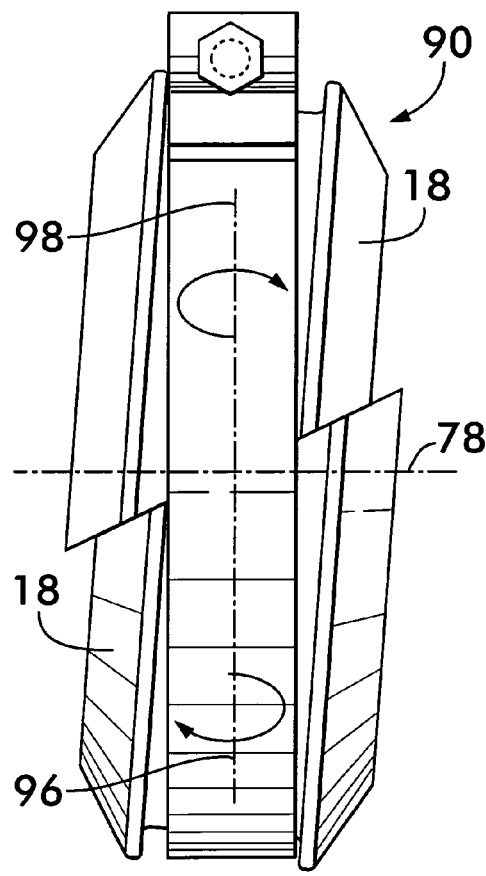
Figure 9:
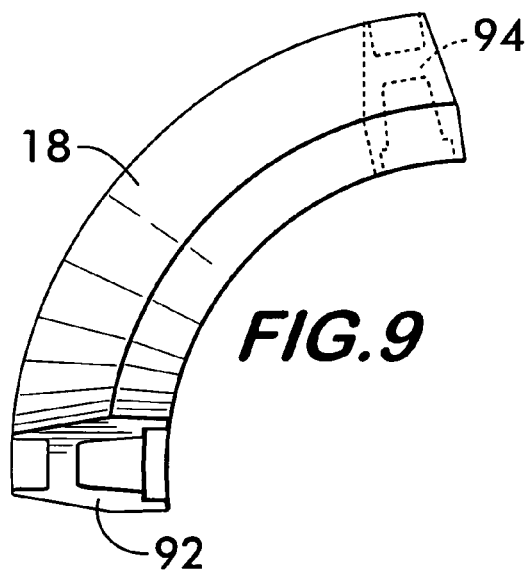
FIG. 9 is an axial view of a segment used with the coupling shown in FIG. 8.
Figure 9A:
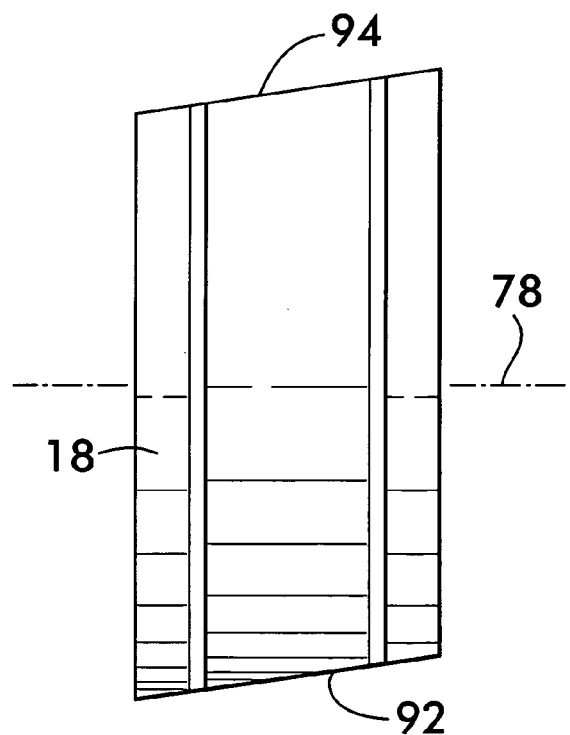
FIG. 9A is a side view of the segment shown in FIG. 9.

In another coupling embodiment 90, shown in FIGS. 8 and 8A, segments 18 have end faces 92 and 94 that are angularly oriented with respect to the longitudinal axis 78 of the pipe elements. This angular orientation is best shown in FIGS. 9 and 9A. FIG. 9 shows an axial view of a single segment 18 from coupling 90 wherein end face 92 is visible but end face 94 is hidden. FIG. 9A shows the segment 18 of FIG. 9 as it would appear looking inwardly toward axis 78 to render the relative orientation of both end faces 92 and 94 visible and emphasize the angular relation between the end faces and the axis 78. Note that the end faces on each segment have substantially the same slope. Furthermore, as shown in FIGS. 8 and 8A, the end faces 92 and 94 on neighboring segments 18 are substantially parallel to one another. In this embodiment, the segments are sized so that the end faces 92 on each segment engage the end faces 94 on each neighboring segment upon tightening of the tensioning member and as the arcuate surfaces begin to engage the outer surface of the pipes being joined together. The angular orientation of the end faces is such that forced contact between them (engendered by tightening of the tensioning member) causes neighboring segments to rotate in opposite directions to one another about respective radii 96 and 98 extending outwardly from axis 78 as shown in FIG. 8A. Relative rotation of the segments 18 is again advantageous when the coupling is used with grooved pipe because the rotational motion of the segments forces the arcuate surfaces into engagement with the shoulders of the grooves and increases the stiffness of the joint about all of its axes.

Pipe couplings having compression bands according to the invention provide for rapid and sure installation, creating a pipe joint while avoiding the need to partially or totally disassemble and then reassemble the coupling and handle the individual piece parts.

What is claimed is:

1. A pipe coupling in combination with a pair of pipe elements, said pipe coupling for securing said pipe elements together in end to end relationship, said pipe elements having circumferential grooves positioned proximate to opposite ends thereof, said pipe coupling comprising:

a deformable sealing member having an inner diameter sized to receive said pipe elements without deforming upon insertion of said pipe elements within said inner diameter, said sealing member having an outer surface;

more than two segments supported on said outer surface of said sealing member, said segments being positioned circumferentially around said sealing member spaced apart from one another at a distance sufficient to permit said pipe elements to be inserted within said inner diameter of said sealing member, each said segment having a pair of arcuate surfaces positioned on opposite sides of said sealing member, said arcuate surfaces being engageable within said circumferential grooves of said pipe elements to retain them in said end to end relationship when said pipe elements are inserted within said inner diameter of said sealing member and said segments are moved radially inwardly against said sealing member;

a compression band extending around an outer perimeter of said segments, said compression band having opposite ends in facing relation, said segments being captured between said compression band and said sealing member; and a tensioning member mounted on said compression band between said opposite ends, said tensioning member being adjustably tightenable for applying tension to said compression band for moving said segments substantially radially inwardly against said sealing member, tightening of said tensioning member moving said arcuate surfaces into engagement within said circumferential grooves of pipe elements.

2. The combination according to claim 1, wherein said segments are spaced apart from one another at substantially equal intervals.

3. The combination according to claim 1, further comprising a projection extending between said compression band and one of said segments, engagement of said projection with said compression band and said one segment limiting relative motion between said band and said one segment and holding said segment substantially at a position relatively to said compression band.

4. The combination according to claim 3, wherein said projection is attached to said one segment and extends substantially radially outwardly therefrom, said compression band having an aperture therethrough for receiving said projection.

5. The combination according to claim 4, wherein said aperture comprises a slot.

6. The combination according to claim 3, wherein said projection is attached to said one segment and extends substantially radially outwardly therefrom, said compression band having an indentation therein for receiving said projection.

7. The combination according to claim 6, wherein said indentation is elongated and extends lengthwise along said compression band.

8. The combination according to claim 3, wherein said projection is attached to said band and extends substantially radially inwardly therefrom, said one segment having an indentation therein for receiving said projection.

9. The combination according to claim 3, wherein said projection is flexible.

10. The combination according to claim 3, wherein said projection is elastically deformable.

11. The combination according to claim 3, wherein said projection is plastically deformable.

12. The combination according to claim 1, wherein said arcuate surfaces project substantially radially inwardly from said segments.

13. The combination according to claim 1, wherein one of said arcuate surfaces on one of said segments comprises at least one tooth that projects substantially radially inwardly from said one segment.

14. The combination according to claim 13, wherein said tooth extends substantially continuously lengthwise along said segment.

15. The combination according to claim 1, wherein one of said arcuate surfaces on one of said segments comprises a plurality of teeth positioned in spaced relation lengthwise along said one segment.

16. The combination according to claim 1, wherein one of said segments comprises first and second sidewalls extending outwardly from said outer perimeter, said sidewalls being in spaced apart relation and defining a trough, said trough being sized to receive said compression band.

17. The combination according to claim 1, wherein said segments have oppositely disposed end faces that are oriented substantially parallel to a longitudinal axis of said pipe elements, said end faces being drawn toward one another upon tightening of said tensioning member.

18. The combination according to claim 1, wherein said segments have oppositely disposed end faces oriented angularly relatively to a longitudinal axis of said pipe elements, for each said segment, said end face at one end thereof having an opposite slope to said end face at an opposite end thereof, each said end face on each said segment being substantially parallel to an adjacent end face on an adjacent one of said segments, said end faces being brought into engagement with one another upon tightening of said tensioning member, said angular orientation of said end faces causing said segments positioned adjacent to one another to move in opposite directions lengthwise along said pipe elements.

19. The combination according to claim 1, wherein said segments have oppositely disposed end faces oriented angularly relatively to a longitudinal axis of said pipe elements, for each said segment, said end face at one end thereof having substantially the same slope as said end face at an opposite end thereof, each said end face on each said segment being substantially parallel to an adjacent end face on an adjacent one of said segments, said end faces being brought into engagement with one another upon tightening of said tensioning member, said angular orientation of said end faces causing said segments positioned adjacent to one another to rotate in opposite directions about respective axes extending substantially perpendicular to said longitudinal axis of said pipe elements.

20. The combination according to claim 1, wherein said tensioning member comprises a threaded bolt rotatably mounted on a first end of said compression band and a threaded body mounted on a second end of said compression band, said first and second ends being in facing relationship, said bolt engaging said threaded body, tightening of said bolt drawing said first and second ends of said compression band toward each other and moving said segments substantially radially inwardly to engage said arcuate surfaces with said pipe elements.

21. A pipe coupling in combination with a pair of pipe elements, said pipe coupling for securing pipe elements together in end to end relationship, said pipe elements having circumferential grooves positioned proximate to opposite ends thereof, said pipe coupling comprising:
a deformable sealing member having an inner diameter sized to receive said pipe elements without deforming upon insertion of said pipe elements within said inner diameter, said sealing member having an outer surface;
more than two segments supported on said outer surface of said sealing member, said segments being positioned circumferentially around said sealing member spaced apart from one another at a distance sufficient to permit said pipe elements to be inserted within said inner diameter of said sealing member, each said segment having a pair of arcuate surfaces positioned on opposite sides of said sealing member, said arcuate surfaces being engageable within said circumferential grooves of said pipe elements to retain them in said end to end relationship when said pipe elements are inserted within said inner diameter of said sealing member and said segments are moved radially inwardly against said sealing member;
a compression band extending around an outer perimeter of said segments, said segments being captured between said compression band and said sealing member;
a projection mounted on each of said segments and extending outwardly therefrom, said compression band having a plurality of apertures therein for receiving said projections, engagement of said projections with said apertures limiting relative motion between said segments and said compression band and maintaining said segments substantially in spaced apart relationship; and a tensioning member mounted on said compression band, said tensioning member being adjustably tightenable for moving said segments substantially radially inwardly against said sealing member, tightening of said tensioning member moving said arcuate surfaces into engagement within said circumferential grooves of said pipe elements.

22. The combination according to claim 21, comprising four of said segments.

23. The combination according to claim 21, wherein said segments are spaced apart from one another at substantially equal intervals.

24. The combination according to claim 21, wherein said apertures comprise slots that extend lengthwise along said band.

25. The combination according to claim 21, wherein said projections are flexible.

26. The combination according to claim 21, wherein said projections are elastically deformable.

27. The combination according to claim 21, wherein said projections are plastically deformable.

28. The combination according to claim 21, wherein said arcuate surfaces project substantially radially inwardly from said segments.

29. The combination according to claim 21, wherein one of said arcuate surfaces on one of said segments comprises at least one tooth that projects substantially radially inwardly from said one segment.

30. The combination according to claim 29, wherein said tooth extends substantially continuously lengthwise along said segment.

31. The combination according to claim 21, wherein one of said arcuate surfaces on one of said segments comprises a plurality of teeth positioned in spaced relation lengthwise along said one segment.

32. The combination according to claim 21, wherein said segments have oppositely disposed end faces that are oriented substantially parallel to a longitudinal axis of said pipe elements, said end faces being brought into engagement with one another upon tightening of said tensioning member.

33. The combination according to claim 21, wherein said segments have oppositely disposed end faces oriented angularly relatively to a longitudinal axis of said pipe elements, for each said segment, said end face at one end thereof having an opposite slope to said end face at an opposite end thereof, each said end face on each said segment being substantially parallel to an adjacent end face on an adjacent one of said segments, said end faces being brought into engagement with one another upon tightening of said tensioning member, said angular orientation of said end faces causing said segments positioned adjacent to one another to move in opposite directions lengthwise along said pipe elements.

34. The combination according to claim 21, wherein said segments have oppositely disposed end faces oriented angularly relatively to a longitudinal axis of said pipe elements, for each said segment, said end face at one end thereof having substantially the same slope as said end face at an opposite end thereof, each said end face on each said segment being substantially parallel to an adjacent end face on an adjacent one of said segments, said end faces being brought into engagement with one another upon tightening of said tensioning member, said angular orientation of said end faces causing said segments positioned adjacent to one another to rotate in opposite directions about respective axes extending substantially perpendicular to said longitudinal axis of said pipe elements.

35. The combination according to claim 21, wherein said tensioning member comprises a threaded bolt rotatably mounted on a first end of said band and a threaded body mounted on a second end of said band, said first and second ends being in facing relationship, said bolt engaging said threaded body, tightening of said bolt drawing said first and second ends of said band toward each other and moving said segments substantially radially inwardly to engage said arcuate surfaces with said pipe elements.

36. A pipe coupling in combination with a pair of pipe elements, said pipe coupling for securing pipe elements together in end to end relationship, said pipe elements having circumferential grooves positioned proximate to opposite ends thereof, said pipe coupling comprising:

a deformable sealing member having an inner diameter sized to receive said pipe elements without deforming upon insertion of said pipe elements within said inner diameter, said sealing member having an outer surface;

more than two segments supported on said outer surface of said sealing member, said segments being positioned circumferentially around said sealing member spaced apart from one another at a distance sufficient to permit said pipe elements to be inserted within said inner diameter of said sealing member, each said segment having a pair of arcuate surfaces positioned on opposite sides of said sealing member, said arcuate surfaces being engageable within said circumferential grooves of said pipe elements to retain them in said end to end relationship when said segments are moved radially inwardly against said sealing member;

a compression band extending around an outer perimeter of said segments, said compression band comprising a plurality of band portions arranged in end to end relation, each said band portion having opposite ends in facing relation with ends of another of said band portions, said segments being captured between said band portions and said sealing member; and a plurality of tensioning members, each mounted on said band portions between said ends in facing relation, said tensioning members being adjustably tightenable for applying tension to said band portions and moving said segments substantially radially inwardly against said sealing member, tightening of said tensioning member moving said arcuate surfaces into engagement with said pipe elements.

* * * * *